June 10, 1958     H. R. BOHNSACK     2,838,354
AUTOMATIC CIGARETTE ASH TRAY
Filed May 10, 1955
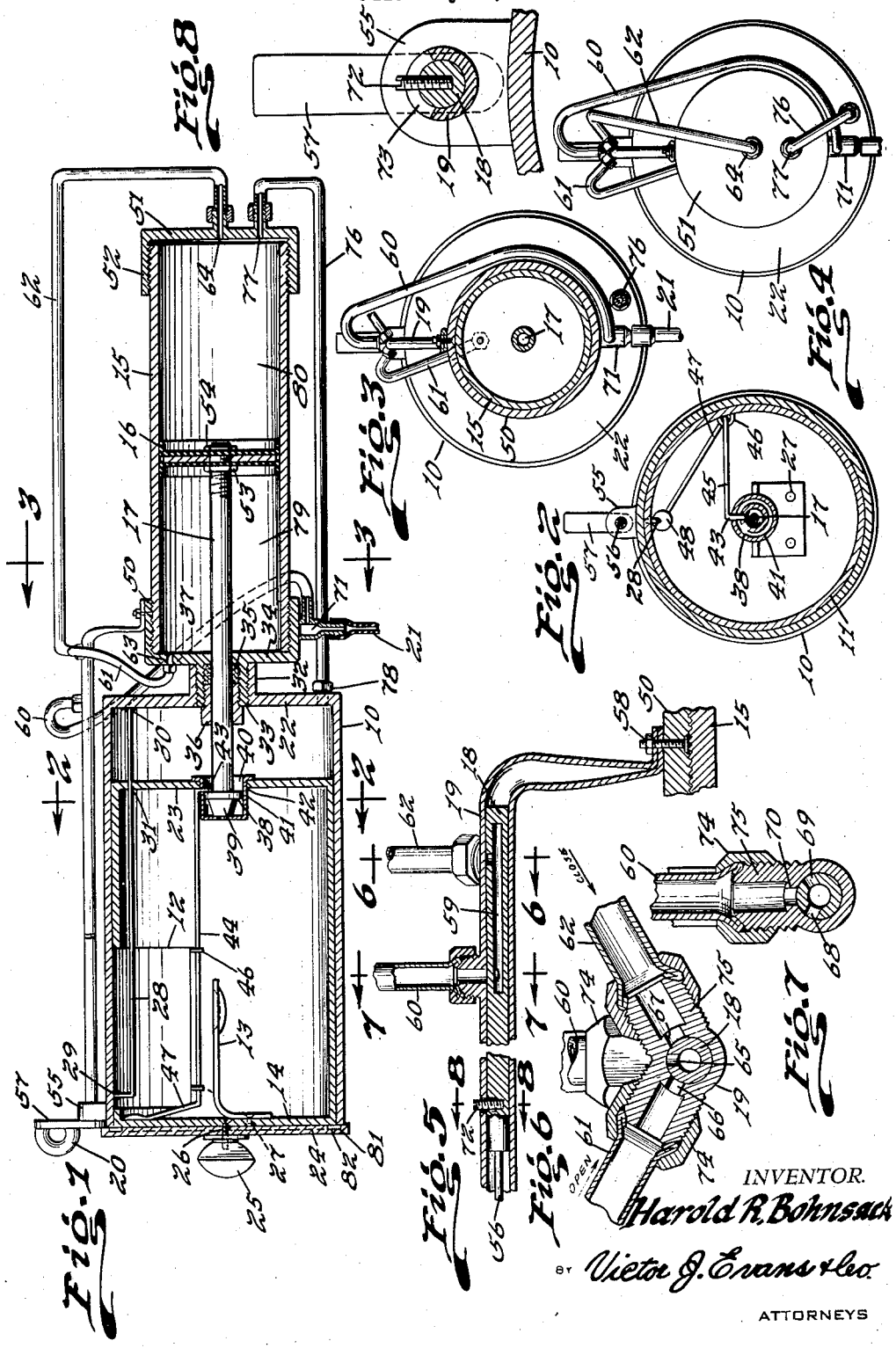
INVENTOR.
*Harold R. Bohnsack*
BY *Victor J. Evans & Co.*
ATTORNEYS United States Patent Office 2,838,354
Patented June 10, 1958

2,838,354

AUTOMATIC CIGARETTE ASH TRAY

Harold R. Bohnsack, Billings, Mont.

Application May 10, 1955, Serial No. 507,313

1 Claim. (Cl. 312—246)

This invention relates to ash trays particularly adapted to be installed in instrument panels of motor vehicles, and in particular, an ash tray longitudinally slidable in a housing with a vacuum actuated piston in a cylinder connected to the tray for extending and retracting the tray and which also provides means for withdrawing air from the tray and surrounding housing to prevent continued burning of cigarette butts and the like.

The purpose of this invention is to provide an ash tray for motor vehicles that eliminates the necessity of snuffing out a lighted cigarette butt so that lighted or burning butts or portions of cigarettes are not thrown from windows of vehicles.

With conventional cigarette ash receivers or trays used in motor vehicles it is necessary for the operator of the vehicle to take his eyes from the highway and look toward the ash tray in order to snuff out a burning cigarette butt or the like and for this reason numerous burning cigarette butts are flipped or thrown from windows of vehicles. With this thought in mind, this invention contemplates an ash receiver for motor vehicles that is extended to receive a burning cigarette butt by moving a button and that is retracted and depleted by air by actuating the same button.

The object of this invention is, therefore, to provide means for forming an ash receiver or tray in which means is provided for removing air from the device after a burning cigarette butt is placed therein so that snuffing out a cigarette butt is obviated.

Another object of the invention is to provide an ash receiver or tray for motor vehicles that is adapted to be actuated by vacuum from the engine of the vehicle.

A further object of the invention is to provide an ash receiver for motor vehicles that is extended and retracted by vacuum of the engine of the vehicle in which the device is of a simple and economical construction.

With these and other objects and advantages in view, the invention embodies an elongated housing adapted to be installed in an instrument panel of a motor vehicle, a tray having an opening in the upper part mounted to slide longitudinally in the housing, a pressure cylinder extended from an inner end of the housing, a piston in the cylinder and having a piston rod extended into the housing and connected to the tray, suitable connections extended from the cylinder to the vacuum system of a vehicle and also from the cylinder to the housing, and a button actuated three way valve for connecting vacuum of the engine of a vehicle to both ends of the cylinder alternately for extending and retracting the ash receiver or tray.

Other features and advantages of the invention will appear from the following description, taken in connection with the drawing, wherein:

Figure 1 is a longitudinal section through the housing, ash receiver and cylinder with the parts shown in position wherein the receiver is in the housing and also showing connections from the cylinder to the vacuum system of an engine of a vehicle in which the device is installed.

Figure 2 is a cross section through the housing of the improved ash receiver being taken on line 2—2 of Figure 1.

Figure 3 is a cross section through the cylinder for operating the ash receiver, said section being taken on line 3—3 of Figure 1.

Figure 4 is an end elevational view looking toward the inner ends of the cylinder and housing showing the tubes connecting a three way valve housing to the cylinder and housing.

Figure 5 is a longitudinal section through a three way valve and adapted to be positioned above the housing with the parts shown on an enlarged scale and showing the parts in positions whereby vacuum is connected to the inner end of the cylinder whereby the ash receiver is retracted and in the postion of closing the housing.

Figure 6 is a cross section through the three way valve shown in Figure 5 taken on line 6—6 of Figure 5 with the parts shown on a still further enlarged scale and with the valve in a neutral position.

Figure 7 is a cross section through the three way valve taken on line 7—7 of Figure 5 also with the parts shown on an enlarged scale and also with the valve in a neutral position.

Figure 8 is a cross section through the three way valve taken on line 8—8 of Figure 5, the parts being shown on a still further enlarged scale and the section showing a set screw for limiting opening and closing movements of the valve.

Referring now to the drawing, wherein like reference characters denote corresponding parts, the improved vacuum actuated ash receiver or tray of this invention includes a cylindrical housing 10, a tray 11 mounted to slide longitudinally in the housing and having an opening 12 in the upper part and at one end thereof, a snuffer 13 mounted on the inner surface of an end 14 of the tray, a cylinder 15 extended from one end of the housing, a piston 16 positioned in the cylinder 15 and connected by a piston rod 17 to the tray 11 and a three way valve core 18 positioned in a tubular housing 19 and adapted to be actuated by a button 20 to place either end of the cylinder 15 in communication with the vacuum of an engine of a vehicle in the instrument panel of which the device is installed through a vacuum supply tube 21.

Although the housing 10 and receiver or tray 11 are disclosed as being cylindrical, it will be understood that the housing and tray may be of any suitable shape in cross section.

The housing 10 includes a cylindrical body extended from a disc 22 providing an end wall, the opposite end being open. The tray 11 is also provided with a cylindrical body, the outer end of which is closed with the wall 14 and a similar wall 23 provides a closure for the inner end. The wall 14 is provided with an end or face plate 24 that overlaps the edges of the housing 10 and the face plate 24 is provided with a knob 25 that is secured to the end wall 14 of the tray with a screw 26. The snuffer 13 is also secured to the end wall 14 with a fastener, such as the screw or rivet as indicated by the numeral 27. The housing 10 is provided with a guide rod 28 that is secured to the inner surface of the housing, such as by welding, as shown at the points 29 and 30, and the rod extends through an opening 31 in the inner end wall 23 of the tray 11 retaining the tray in such a position that the opening 12 is in the upper side thereof.

The inner end wall 22 of the housing 10 is provided with an internally threaded boss 32 into which a threaded nipple 33 extended from an end wall 34 of the cylinder 15 is threaded and, as illustrated in Figure 1, the nipple 33 is provided with a packing gland 35 in which a packing bushing 36, which is threaded in the nipple 33, is positioned.

The piston rod 17 extends through the bushing 36 and also through an opening 37 in the end wall 34 of the cylinder 15 and the extended end of the piston rod is provided with a collar 38 with a frusto-conical shaped guide element 39 on the outer face whereby in assembling the parts the element 39 extends through an opening 40 in a cup shaped retainer 41 positioned in an opening 42 in the end wall 23 of the tray and with the parts 38 and 39 positioned in the retainer a latch 43 on the end of a rod 44 drops in behind the collar 38 retaining the parts in assembled relation. The latch 43 is carried by the end of an arm 45 extended from the rod 44 and, as illustrated in Figure 2, the rod 44 is pivotally mounted in bearings 46 on the inner surface of the tray 11. The end of the rod 44, opposite to the end on which the latch 43 is positioned, is provided with an operating arm 47 having a button 48 on the end and the button 48 is adapted to be drawn outwardly and moved upwardly to turn the rod 44 to elevate the latch 43 to release the collar 38.

The head or end wall at one end of the cylinder 15 is provided with a flange 50 that is threaded on the outer surface of the cylinder, and a similar end wall or head 51 provided with a similar flange 52, is threaded on the opposite end. The piston 16, which may be of any suitable design, is secured to the threaded end of the piston rod 17 with lock nuts 53 and 54.

The piston 16 is actuated by vacuum of an engine of a vehicle upon which the device is installed.

The core 18 of the three way valve is positioned in the tubular casing 19 which extends from a bearing 55 on the upper side of the housing 10 and the core is connected by a rod 56 to a lever 57 on which the button 20 is positioned. The opposite end of the tube 18 is extended downwardly, as shown in Figure 5, and secured to the flange 50 of the head 34 of the cylinder 15 with a bolt 58. The core 18 is provided with a longitudinally disposed opening 59 that provides communicating means between a supply connection 60 and connections 61 and 62 of the cylinder 15, the connection 61 extending to an opening 63 in the head 34 and the connection 62 extending to an opening 64 in the head 51.

As illustrated in Figure 6, the core 58 is provided with an opening 65 that is adapted to register with an opening 66 providing communicating means with the connection 61 and also with an opening 67 which provides communicating means with the connection 62. The core 18 is also provided with openings 68 and 69 that are positioned to register with an opening 70 in the tube 19 to provide communicating means between the supply connection 60 and the connections 61 and 62 alternately. The connection 60 is connected to the supply tube 21 through a fitting 71, as shown in Figure 1, the fitting 71 being secured to the flange 50 of the head 34 by sweating, brazing, or welding, as may be desired.

The core 18 is also provided with a set screw 72 that is positioned to extend into a slot 73 in the housing 19 to limit the turning movement of the core, the ends of the slot 73 providing stops whereby the opening 65 of the core may be in registering relation with the openings 66 and 67, respectively. Each of the connections 60, 61 and 62 is provided with a coupling nut 74 that is threaded on a nipple 75 of the tube or housing 19.

The device is also provided with a capillary tube 76 that extends from an opening 77 in the cylinder 15 to a connection 78 in the end wall 22 of the housing 10 whereby vacuum admitted to the cylinder 15 through the opening 64 and tube 62, after drawing the piston 16 and tray 11 whereby the tray is positioned in the housing 10 draws air from the interior of the housing 10 and tray 11 so that a burning cigarette butt deposited into the tray will be deprived of air which will terminate burning thereof.

With the parts assembled as shown and described, an operator of a motor vehicle having a burning cigarette butt presses the button 20 toward one side whereby vacuum is applied to an area 79 of the cylinder 15 through the connection 61, drawing the piston 16 toward the housing 10 and moving the tray 11 outwardly so that the burning cigarette butt may be placed through the opening 12 into the tray or receiver and with the burning cigarette in the tray the button 20 is moved to the opposite side of the center whereby a vacuum is applied to an area 80 of the cylinder 15 drawing the piston 16 inwardly and withdrawing air from the housing 10 and tray 11.

By this means the cigarette butt and ash receiver is moved outwardly for receiving a cigarette butt or ashes and also returned to the sealed or inner position by moving a button, such as the button 20 positioned above the end of the tray.

The cigarette ash tray of this invention, therefore provides a sealed area, in which burning cigarette butts may be placed and extinguished or smothered from lack of air or oxygen, one end of the housing being sealed by the packing gland 35 and the other by a sealing gasket 81 in an annular recess 82 in the inner surface of the face plate 24.

Although the device is illustrated and described as being positioned in an instrument board or panel of a motor vehicle or airplane, it will be understood that it may be used for other purposes and in other positions such as in the back of a front seat of a vehicle, or it may be used for individual seats, such as in airplanes.

It will be understood that modifications, within the scope of the appended claim, may be made in the design and arrangement of the parts without departing from the spirit of the invention.

What is claimed is:

In an ash tray for use in an instrument panel of a motor vehicle, the combination which comprises a cylindrical housing having an open end and a closed end formed to be installed in an opening of an instrument panel of a vehicle, a cylindrical tray poistioned in the housing and mounted to slide longitudinally therein, a closure plate carried by the end of the tray extended from the open end of the cylindrical housing, said tray having a cigarette butt receiving opening in the upper portion, the closed end of the housing having a packing gland therein, a piston rod extended through the packing gland of the housing, a latch for connecting one end of the piston rod to the cigarette butt receiving tray, means for actuating the latch from the end of the tray in which the opening is positioned, a cylinder aligned with and extended from the cylindrical housing, a piston in said cylinder, means for connecting the piston to the piston rod, connections in opposite ends of the cylinder extended to a vacuum supply, and a manually actuated valve in said connections for supplying vacuum, selectively, to opposite ends of the cylinder for extending and retracting the cigarette butt receiving ash tray.

References Cited in the file of this patent

UNITED STATES PATENTS

| | | |
|---|---|---|
| 2,185,763 | De Lisle | Jan. 2, 1940 |
| 2,300,026 | Visser | Oct. 27, 1942 |
| 2,382,354 | Wales | Aug. 14, 1945 |
| 2,425,816 | Maxson | Aug. 19, 1947 |
| 2,447,364 | Renshaw | Aug. 17, 1948 |
| 2,461,815 | Gill | Feb. 15, 1949 |
| 2,616,557 | Gill et al. | Nov. 4, 1952 |
| 2,633,854 | Boland et al. | Apr. 7, 1953 |
| 2,656,039 | Leland | Oct. 20, 1953 |